(12) United States Patent
Fernandez et al.

(10) Patent No.: US 12,640,605 B2
(45) Date of Patent: May 26, 2026

---

(54) ROTOR FOR A ROTARY ELECTRIC MACHINE

(71) Applicant: NIDEC PSA EMOTORS, Carrieres Sous Poissy (FR)

(72) Inventors: Alejandro Fernandez, Asnieres sur Seine (FR); Moustafa Al Eit, Asnieres sur Seine (FR); Jacques Saint-Michel, Angoulême (FR); Samuel Koechlin, Angoulême (FR)

( * ) Notice: Subject to any disclaimer, the term of this patent is extended or adjusted under 35 U.S.C. 154(b) by 261 days.

(21) Appl. No.: 18/548,467

(22) PCT Filed: Feb. 1, 2022

(86) PCT No.: PCT/FR2022/050169
§ 371 (c)(1),
(2) Date: Aug. 30, 2023

(87) PCT Pub. No.: WO2022/207985
PCT Pub. Date: Oct. 6, 2022

(65) Prior Publication Data
US 2024/0146127 A1 May 2, 2024

(30) Foreign Application Priority Data
Mar. 29, 2021 (FR) ..................................... 2103152

(51) Int. Cl.
*H02K 1/27* (2022.01)
*H02K 1/276* (2022.01)

(52) U.S. Cl.
CPC .................................. *H02K 1/276* (2013.01)

(58) Field of Classification Search
CPC ... H02K 1/276; H02K 1/2766; H02K 2213/03
See application file for complete search history.

(56) References Cited

U.S. PATENT DOCUMENTS

| | | |
|---|---|---|
| RE44,037 E | 3/2013 | Tajima et al. |
| 2007/0096577 A1 | 5/2007 | Guven et al. |

(Continued)

FOREIGN PATENT DOCUMENTS

| | | |
|---|---|---|
| CN | 208316434 U | 1/2019 |
| CN | 110212666 A | 9/2019 |

(Continued)

OTHER PUBLICATIONS

International Search Report to PCT/FR2022/050169 mailed Mar. 31, 2022.
Written Opinion to PCT/FR2022/050169 mailed Mar. 31, 2022.

*Primary Examiner* — Thomas Truong
(74) *Attorney, Agent, or Firm* — Sandberg Phoenix & von Gontard, PC

(57) ABSTRACT

A rotor (30) for a rotary electric machine, comprising a rotor mass (33) comprising laminations stacked one on top of the other, the rotor mass (33) comprising a plurality of housings (10), at least some of the housings, or even all of the housings, receiving one or more permanent magnets (1) defining poles of the rotor, the housings of a pole being arranged in at least a first row (11) and a second row (12) of housings which are not parallel to one another, the first row (11) of housings comprising at least three housings arranged in a U shape, with at least one central housing and two lateral housings, the central housing of the first row being able to do without a permanent magnet, the second row (12) of housings comprising housings arranged in a V shape, in particular two housings arranged in a V shape.

21 Claims, 3 Drawing Sheets

(56)        References Cited

U.S. PATENT DOCUMENTS

| | | |
|---|---|---|
| 2007/0096578 A1 | 5/2007 | Jahns et al. |
| 2008/0007131 A1 | 1/2008 | Cai et al. |
| 2009/0026868 A1 | 1/2009 | Morgante |
| 2009/0045689 A1 | 2/2009 | Haruno et al. |
| 2013/0020889 A1 | 1/2013 | Yamamoto et al. |
| 2014/0084729 A1 | 3/2014 | Nakazono |
| 2015/0229170 A1* | 8/2015 | Koechlin ............. H02K 1/2766 |
| | | 310/156.53 |
| 2015/0280499 A1 | 10/2015 | Pandi |
| 2017/0040854 A1* | 2/2017 | Saint-Michel ........... H02K 3/12 |
| 2017/0317540 A1 | 11/2017 | Laldin |
| 2018/0183286 A1* | 6/2018 | Nakano ................ H02K 1/2766 |
| 2018/0241262 A1* | 8/2018 | Tang .................... H02K 21/145 |
| 2018/0351440 A1* | 12/2018 | Gieras .................. H02K 1/2746 |
| 2020/0259377 A1 | 8/2020 | Gangi et al. |
| 2024/0120785 A1* | 4/2024 | Fratila ................. H02K 1/2766 |

FOREIGN PATENT DOCUMENTS

| | | | |
|---|---|---|---|
| DE | 10 2017 206928 A1 | | 10/2018 |
| EP | 2518871 B1 | | 3/2017 |
| JP | 2007274798 A | * | 10/2007 |
| WO | 2019049397 A1 | | 3/2019 |
| WO | 2019179864 A1 | | 9/2019 |
| WO | 2020067347 A1 | | 4/2020 |
| WO | 2020221543 A1 | | 11/2020 |

* cited by examiner

ROTOR FOR A ROTARY ELECTRIC MACHINE

CROSS-REFERENCE TO RELATED APPLICATIONS

This application is the US National Stage under 35 USC § 371 of International Application No. PCT/FR2022/050169, filed Feb. 1, 2022, which claims the priority of French application 2103152 filed on Mar. 29, 2021, the content (text, drawings and claims) of both said applications being incorporated by reference herein.

BACKGROUND

The devices disclosed herein relate to rotary electric machines, motors or generators, and more particularly to the rotors for such machines. They also relate to permanent-magnet rotors.

More particularly, related herein are synchronous or asynchronous AC machines. In particular, the described devices relate to traction or drive machines for electric motor vehicles (Battery Electric Vehicles) and/or hybrid motor vehicles (Hybrid Electric Vehicles—Plug-in Hybrid Electric Vehicles), such as private cars, vans, trucks or buses. The description also applies to rotary electric machines for industrial and/or power generation applications, in particular naval, aerospace or wind turbine applications.

Permanent-magnet rotors are generally composed of a rotor body and of permanent magnets of various geometric shapes. The rotor body may comprise a stack of cut, thin magnetic laminations. It may comprise one or more stacks of laminations stacked one on top of the other.

The permanent magnets may be arranged on the surface, directly facing the air gap or, alternatively, be arranged inside the rotor body, in recesses therein, then being said to be "buried" or "embedded."

In this case, they can be arranged in rows, such as for example in application US 2007/0096578, wherein the recesses of the magnets have half-circle rounded ends, as well as in application US 2007/0096577.

In applications CN 110212666, US 2013/0020889 and DE 10 2017 206928, there is a permanent magnet arranged on the surface and a single row of buried magnets.

In applications US RE 44037, US 2014/084729, US 2009/045689 and EP 2518871, there is a single row of buried magnets.

In applications US 2015/280499 and WO 2019/179864, the permanent magnets of the two rows are arranged in a V shape. There is no U-shaped row.

In applications US 2017/317540 and US 2008/007131, the rows are arranged in such a way that two magnets of two rows are also parallel to one another.

In applications WO 2020/221543 and US 2020/259377, the large row comprises four recesses arranged in a V shape, with each branch of the V shape composed of two non-aligned lateral recesses, and being free of a central recess.

Finally, international application WO 2019/049397 comprises a circulation of cooling fluid in the recesses, on either side of the permanent magnets of each row. The inclination between the permanent magnets of the two rows is quite significant.

There is a need to improve the magnetic performance and in particular the torque density of the rotary electric machines, and to reduce their manufacturing and assembly cost.

SUMMARY

An object, according to one aspect, is a rotor of a rotary electric machine, comprising a rotor body comprising laminations stacked one on top of the other, the rotor body comprising a plurality of recesses, at least some of the recesses, or even all of the recesses, accommodating one or more permanent magnets defining poles of the rotor, the recesses of a pole being arranged in at least a first and a second row of recesses, which are not parallel to one another, the first row of recesses comprising at least three recesses arranged in a U shape, with at least one central recess and two lateral recesses, the central recess of the first row being able to be free of a permanent magnet, the second row of recesses comprising recesses arranged in a V shape, in particular two recesses arranged in a V shape.

It is possible to increase the torque of the machine and thus the torque density without increasing the volume of the magnets accommodated in the rotor body, by improving the saliency torque. This makes it possible to improve the reluctance torque/saliency torque of the machine. Losses, risks of noise and vibrations of electromagnetic origin are also reduced.

The first and second rows of recesses are not parallel to one another, in the sense that there is no recess in one of the rows that would be parallel to a recess in the other row. The large axes of the permanent magnets of each of the rows are not parallel to one another.

In one embodiment, the first row only comprises two lateral recesses, each arranged on one side of the central recess. The first row may not comprise two recesses on the same side of the central recess. The first row may not comprise two permanent magnets on the same side of the central recess.

For the same electromagnetic result, the amount of magnets can be reduced.

The leakage flows are minimized thanks to the shape of the rows of recesses and their dimensions.

The rotor is particularly suitable for operations at high speed, of the order of 18,000 rpm for example.

In one embodiment, the rotor comprises a first and a second row of recesses per pole, and is devoid of any additional row. The second row may be closer to the air gap than the first row. The first row is further away from the air gap than the second row.

The two side recesses are symmetrical to one another relative to an axis of the pole.

The rotor body may comprise one or more stacks of laminations stacked one on top of the other. Each stack of laminations may comprise at least one recess accommodating the permanent magnet. In the case where the rotor body comprises multiple stacks of laminations, the rotor body may comprise, for one and the same recess, one or more permanent magnets, for example one permanent magnet per stack of laminations.

The described devices thus relate in particular, according to one aspect, to a rotor of a rotary electric machine, a rotor body comprising laminations stacked one on top of the other, the rotor body comprising a plurality of recesses, at least some of the recesses accommodating one or more permanent magnets defining poles of the rotor, the recesses of a pole being arranged in at least a first and a second row of recesses, which are not parallel to one another, the first row of recesses comprising at least three recesses arranged in a U shape, with at least one central recess and two lateral recesses, the central recess of the first row being free of a permanent magnet, the second row of recesses comprising recesses arranged in a V shape, in particular two recesses arranged in a V shape, the central recess of the first row being separated from each of the lateral recesses by a material bridge, each of the material bridges extending along an axis of the material bridge which forms a non-zero angle y with an axis of the pole.

The described devices also relate, according to another aspect, to a rotor for a rotary electric machine, comprising a rotor body comprising laminations stacked one on top of the other, the rotor body comprising a plurality of recesses, at least some of the recesses accommodating one or more permanent magnets defining poles of the rotor, the recesses of a pole being arranged in at least a first and a second row of recesses, which are not parallel to one another, the first row of recesses comprising at least three recesses arranged in a U shape, with at least one central recess and two lateral recesses, the central recess of the first row being able to be free of a permanent magnet, the second row of recesses comprising recesses arranged in a V shape, in particular two recesses arranged in a V shape, the permanent magnets accommodated in the lateral recesses of the first row extending in cross section along a large axis forming an angle $\beta 2$ with an axis perpendicular to an axis of the pole, and the permanent magnets accommodated in the recesses of the second row extending in cross section along a large axis forming an angle $\alpha 2$ with an axis perpendicular to an axis of the pole, wherein $\beta 2 > \alpha 2$.

Independently or in combination with the foregoing, the rotor may comprise one or more of the following features.

The permanent magnets accommodated in the lateral recesses of the first row may extend in cross section along a large axis forming an angle $\beta 2$ with an axis perpendicular to an axis of the pole. The permanent magnets accommodated in the recesses of the second row may extend in cross section along a large axis forming an angle $\alpha 2$ with an axis perpendicular to an axis of the pole.

It is possible to have $\beta 2 > \alpha 2$. The ratio $\beta 2 / \alpha 2$ may be between 1 and 1.25, excluding the value 1, better still between 1.05 and 1.20, or even between 1.10 and 1.15, being for example 1.11.

The angle $\alpha 2$ may for example be comprised in the range 25° to 50°, better still 30° to 48°, being for example 45°.

The angle $\beta 2$ may for example be comprised in the range 30° to 55°, better still 35° to 53°, being for example 50°.

Considering the difference between $\beta 2$ and $\alpha 2$, the two rows of recesses are separated by a lamination strip having a width that increases as it approaches the axis of the pole.

The width of the lamination strip may for example vary from a width d1 at the axis of the pole, to a width d2 at the air gap, at the ends of the rows. A ratio d1/d2 may in particular be greater than 1. For example, d1/d2 may be comprised between 1, excluding this value, and 1.65. In one embodiment, d1/d2=1.43. In another example embodiment, d1/d2=1.44.

The permanent magnet or magnets accommodated in the first row of recesses in a branch of the U shape are aligned with one another.

Furthermore, the width of the first row of recesses increases as it approaches the axis of the pole. The central recess is wider than the lateral recesses, in cross section. This makes it possible to reduce the magnetic leakage of the magnets as well as to increase the saliency torque.

A ratio h3/h2 may be defined between the width h3 of the row at the axis of the pole and the width h2 of the first row at the magnets, at the ends of the rows. The ratio h3/h2 may in particular be greater than 1. For example, h3/h2 may be comprised between 1, excluding this value, and 1.75. In one example embodiment, h3/h2=1.58.

At least one of the lateral recesses of the first row, in particular the two lateral recesses of the first row, may comprise a notch that extends from the lateral recess toward the central recess. The notch may gradually widen as it approaches the central recess. The notch is free of a permanent magnet.

The notch may have an edge that forms an angle $\beta 1$ with an axis perpendicular to an axis of the pole. The edge in question is the edge of the notch located on the side of the lamination strip between the two rows of recesses. The edge may be rectilinear, or at least partially rectilinear, or alternatively the edge may not be rectilinear, and in this case the tangent to the edge is considered. The angle $\beta 1$ may for example be comprised in the range 0° to 35°, better still 10° to 30°, being for example 23.3° or 25°. The ratio $\beta 2 / \beta 1$ may be between 1.2 and 3, better still between 1.5 and 2.5, being for example 2.15 or 2.

The notch may have an edge that extends at least partially parallel to an edge of the central recess.

The central recess of the first row may be separated from each of the lateral recesses by a material bridge. The first row thus comprises two material bridges on either side of the central recess.

Each of the material bridges extends along an axis of the material bridge that forms a non-zero angle $\gamma$ with an axis of the pole. The fact of having two material bridges in the first row makes it possible to reduce the stress concentration between the shaft and each of the bridges. Furthermore, the choice of the angle of the bridge makes it possible to improve the mechanical strength.

The angle $\gamma$ may be between 10° and 40°, in particular between 15° and 35°, better still between 20° and 30°, being for example of the order of 25°. Such an inclination of the material bridges makes it possible to improve the mechanical strength of the laminations, and thus the magnetic performance because the leakage flows of the magnets may be reduced.

Each material bridge may be defined by two edges parallel to one another. The material bridge between the lateral recesses and the central recess may have a minimum width conditioned by the constraints of mechanical strength. Its width is substantially equal to at least the thickness of the magnetic lamination. Each material bridge may have a width of less than 3.05 mm, better still less than 2.7 mm, being for example 2.35 mm.

In particular, the material bridges may come closer to the axis of the pole as they approach the air gap and move away from an axis of rotation of the rotor. The material bridges move away from the axis of the pole as they approach an axis of rotation of the rotor. Such a configuration makes it possible to improve the mechanical strength of the rotor. It also makes it possible to improve the magnetic performance, since the leakage flow of the magnets is thus reduced.

The central recess may comprise an edge on the side of the axis of rotation of the rotor which is at least partially rectilinear, being in particular perpendicular to an axis of the pole.

The central recess may be defined on the side opposite the axis of rotation by a concave edge which may be formed by two rectilinear portions forming an angle therebetween, which makes it possible not to reduce the width of the lamination strip between the two rows, at the material bridge of the second row. This is advantageous magnetically. In one alternative embodiment, the concave edge may be rounded, for example following an arc of circle.

The side recesses of the first row may be provided with permanent magnets.

The central recess of the first row may be free of a permanent magnet. It may be empty.

Alternatively, the central recess of the first row may be provided with a permanent magnet, for example a permanent magnet that is smaller than the permanent magnets of the lateral recesses. Depending on the choice of the presence or absence of a central permanent magnet, the rotor may advantageously allow a certain modularity for the resulting machine.

The permanent magnets of the side recesses of the first row may be identical to one another. They may in particular have the same size in cross section.

The permanent magnets of the first row may be of the same width as the permanent magnets of the second row.

The permanent magnets of the first row may be twice as long as the permanent magnets of the second row, or alternatively the same length, in this case with two permanent magnets per branch of the U, which are preferably aligned. It is thus advantageously possible to reduce the required diversity of magnet sizes, and for example to have a single size of magnet for the rotor. Thus, the losses induced by eddy currents in the magnets are reduced.

The "length" is measured along the axis of the row of recesses. "Width" is referred to in order to designate the dimension perpendicular to the length in the plane of a cross section of the rotor body.

In one embodiment, the length of a magnet of the second row may be equal to the length of a magnet of the first row. All of the magnets of a pole may have the same length.

The recesses of the second row may be arranged in a V-shape. The second row may in particular comprise two recesses arranged in a V. They may be symmetrical to one another relative to an axis of the pole. In one embodiment, all the recesses in the second row are provided with permanent magnets. The V-shaped configuration of the second row makes it possible to save space, and to avoid any risk of saturation of the magnetic circuit.

In another alternative embodiment, the recesses of the second row are empty, with no magnets.

The permanent magnets of the second row may be identical to one another. They may in particular have the same size in cross section. The permanent magnets of the second row may have a different size from the permanent magnets of the first row, for example smaller.

The second row may be free of a central recess. The second row may comprise only lateral recesses, which may accommodate permanent magnets.

At least one of the recesses of the second row, in particular the two recesses of the second row, may comprise a notch that extends from said recess to the other recess of the second row. The notch may gradually widen as it approaches the other recess. The notch is free of a permanent magnet.

The notch may comprise an edge on the side opposite the axis of rotation which is rectilinear and which extends perpendicularly to an axis of the pole. The two edges of the two notches of the second row may thus be aligned.

The notch may have an edge that forms an angle $\alpha 1$ with an axis perpendicular to an axis of the pole. The edge in question is the edge of the notch located on the side of the lamination strip between the two rows of recesses. The angle $\alpha 1$ may for example be comprised in the range $0°$ to $25°$, better still $10°$ to $23°$, being for example $20°$.

The ratio $\alpha 2/\alpha 1$ may be between 1.2 and 3, better still between 1.5 and 2.5, for example 2.25.

The ratio $\beta 1/\alpha 1$ may be between 1 and 1.5, optionally excluding the value 1, better still between 1.1 and 1.4, being for example 1.165 or 1.25. Considering the difference between $\beta 1$ and $\alpha 1$, the two rows of recesses are separated by a lamination strip having a width that increases as it approaches the axis of the pole. The width of the lamination strip between the two rows of recesses is greater at the axis of the pole. The difference between $\beta 1$ and $\alpha 1$ is quite small, so that the disruption to the passage of the magnetic flux in the lamination strip between the two rows of recesses is minimized.

The two recesses of the second row may arrange therebetween a material bridge, said material bridge extending along an axis of the material bridge that extends along an axis of the pole. The material bridge may be defined by two edges parallel to one another. In particular, these two parallel edges are edges of the notches of the two recesses of the second row. The material bridge may have a width less than 1.7 mm, better still less than 1.5 mm, being for example 1.3 mm.

Furthermore, the width of the second row of recesses increases as it approaches the axis of the pole. This makes it possible to reduce the magnetic leakage of the magnets as well as to increase the saliency torque. A ratio h1/h2 may be defined between the width h1 of the row at the axis of the pole and the width h2 of the second row at the magnets, at the ends of the rows. The ratio h1/h2 may in particular be greater than 1. For example, h1/h2 can be between 1, excluding this value, and 1.75. In one example embodiment, h1/h2=1.33.

The rotor may comprise 6 poles. The choice of the number of poles makes it possible to ensure defluxing of the machine and high yields at high speed.

At least one recess may comprise at least one stop for holding the permanent magnet intended to be accommodated in the recess. Each recess may comprise a stop located toward the air gap.

The recesses are each separated from the air gap by a material bridge whose width is conditioned by the mechanical strength constraints. Their width is substantially equal at least to the thickness of the magnetic lamination. The length of these bridges is substantially equal to the width of the recesses.

The lateral recesses may also optionally comprise a stop situated toward the notch, for holding the permanent magnet.

The rotor may be free of cooling liquid circulation in the recesses. In particular, the notches may not be configured to allow the circulation of a cooling liquid.

Another subject is a rotary electric machine, comprising a stator and a rotor as defined hereinbefore.

The machine may be used as a motor or as a generator. The machine may be a reluctance machine. It may operate as a synchronous motor or, alternatively, as a synchronous generator. Alternatively still, it is an asynchronous machine.

The maximum rotational speed of the machine may be high, for example higher than 10,000 rpm, better still higher than 12,000 rpm, for example of the order of 14,000 rpm to 15,000 rpm, or even 20,000 rpm or 24,000 rpm or 25,000 rpm. The maximum rotational speed of the machine may be lower than 100,000 rpm, or lower than 60,000 rpm, or even lower than 40,000 rpm, better still lower than 30,000 rpm.

The described devices may be most particularly suitable for high-power machines.

The machine may include a single inner rotor or, alternatively, an inner rotor and an outer rotor, which are arranged radially on either side of the stator and are rotationally coupled.

The machine can operate alone or be coupled to a gearbox. In this case, it is placed in a casing that also houses a gearbox.

The machine includes a stator. The stator includes teeth which define slots between them. The stator may include electrical conductors, and at least some of the electrical conductors, or even most of the electrical conductors, may be in the form of U- or I-shaped pins. Alternatively, the electrical conductors may include round wire.

The stator may be star-connected or delta-connected.

The machine may comprise a number of poles between 2 and 48, better still between 4 and 24, or even between 6 and 12, for example 6 or 8.

Another subject is a method for producing a rotor for a rotary electric machine as defined hereinbefore.

The method may comprise the step of longitudinally inserting, along the axis of rotation of the rotor, at least one permanent magnet into the recess.

In the case where the rotor body comprises multiple stacks of laminations stacked one on top of the other, the method may first comprise the step of longitudinally inserting at least one permanent magnet into the recess of each stack of laminations, then the step of stacking the stacks of laminations one on top of the other, with the permanent magnets in the recesses.

BRIEF DESCRIPTION OF THE DRAWINGS

FIG. 4b is a view similar to FIG. 1 of another lamination of the alternative of FIG. 4a.

DETAILED DESCRIPTION

Figure 1:
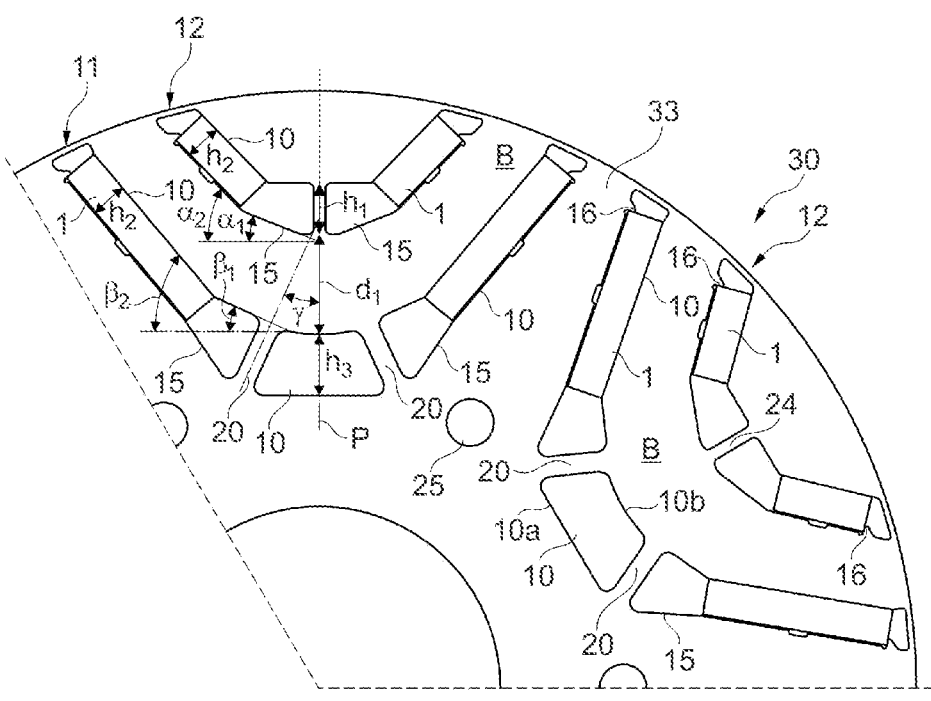
FIG. 1 is a schematic and partial view, in cross section, of a rotor for a rotary electric machine.
Figure 2:
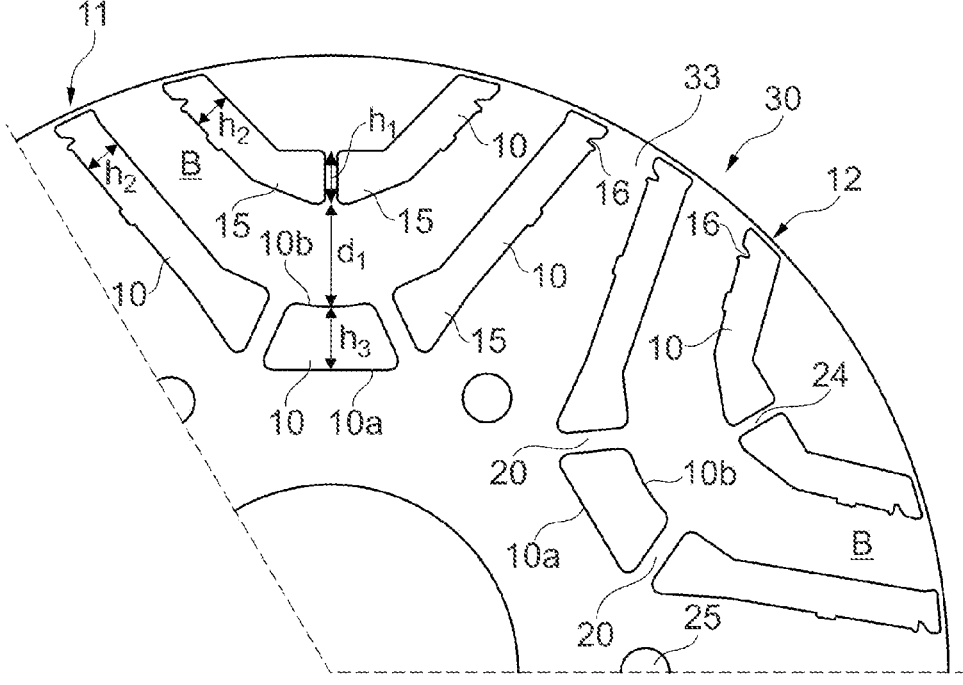
FIG. 2 is a view similar to FIG. 1 but without the permanent magnets.
Figure 3:
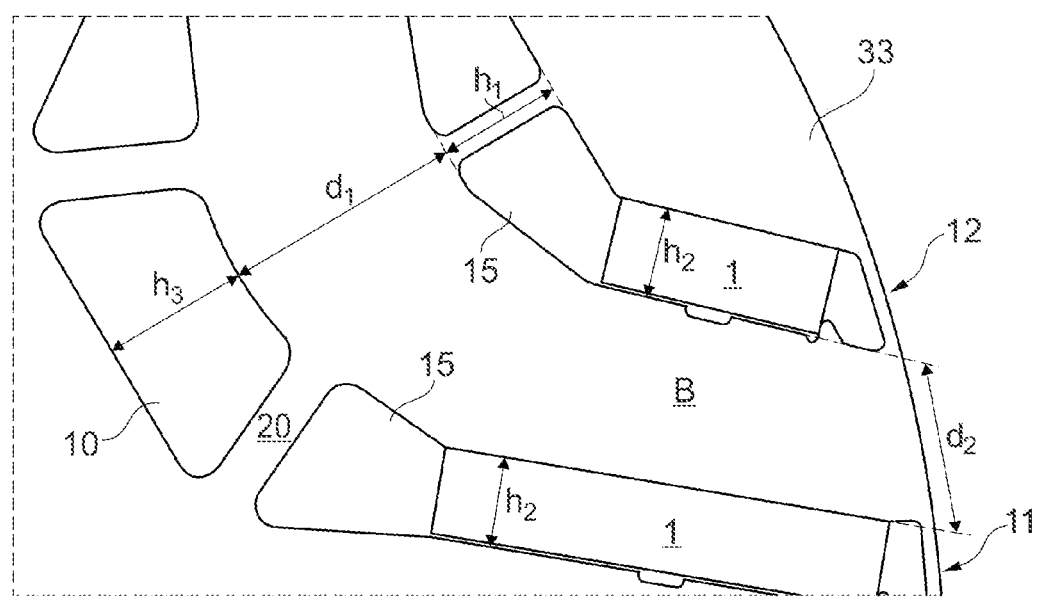
FIG. 3 is a detail view of FIG. 1.

FIGS. 1 to 3 show a rotor 30 for a rotary electric machine, comprising a rotor body 33 wherein recesses 10 are formed. Permanent magnets 1 are inserted into each of the recesses 10, so as to define poles of the rotor. This rotor is intended to be associated with a stator, not shown.

In this example, the magnets 1 have a generally rectangular cross-sectional shape. Each magnet 1 has, in cross section, both a first long side and a second long side, opposite the first, and a first short side and a second short side, opposite the first. Each recess 10 is delimited by two faces that face the first long side and the second long side of the magnet 1, respectively.

The recesses 10 of a pole are arranged in a first row 11 of recesses further away from the air gap and a second row 12 of recesses closer to the air gap. The first and second rows of recesses are not parallel to one another.

The first row 11 of recesses 10 comprises three recesses 10 arranged in a U-shape, with a central recess and two lateral recesses symmetrical to one another relative to an axis of the pole P. In the example described, the central recess of the first row is empty, being able to be free of a permanent magnet.

The lateral recesses of the first row 11 are provided with permanent magnets 1. The permanent magnets of the lateral recesses of the first row 11 are identical to one another. They in particular have the same size in cross section.

The second row 12 comprises two recesses arranged in a V shape. They are symmetrical to one another relative to an axis of the pole P. In the example described, all the recesses of the second row 12 are provided with permanent magnets 1. The permanent magnets of the second row are identical to one another. They in particular have the same size in cross section.

The permanent magnets 1 accommodated in the lateral recesses of the first row 11 extend in cross section along a large axis forming an angle $\beta 2$ with an axis perpendicular to an axis of the pole.

The permanent magnets accommodated in the recesses of the second row extend in cross section along a large axis forming an angle $\alpha 2$ with an axis perpendicular to an axis of the pole.

Illustratively, $\beta 2 > \alpha 2$. The ratio $\beta 2 / \alpha 2$ may be for example 1.11.

The angle $\alpha 2$ may for example be 45°.

The angle $\beta 2$ may for example be 50°.

Considering the difference between $\beta 2$ and $\alpha 2$, the two rows of recesses are separated by a lamination strip B having a width that increases as it approaches the axis of the pole. The width of the lamination strip B varies from a width d1 at the axis of the pole, to a width d2 at the air gap, at the ends of the rows, as can be seen clearly in FIG. 3. The width d2 is measured on a straight line extending between the intersection points obtained by extending the edge of the recesses with the outside diameter of the rotor, at the air gap. A ratio d1/d2 is in particular greater than 1. For example, it is possible to have d1/d2=1.43.

Furthermore, the width of the first row of recesses increases as it approaches the axis of the pole. The central recess is wider than the lateral recesses, in cross section. A ratio h3/h2 may be defined between the width h3 of the first row 11 at the axis of the pole and the width h2 of the first row at the magnets, at the ends of the rows. The ratio h3/h2 is in particular greater than 1. For example, it is possible to have h3/h2=1.58.

Furthermore, the two lateral recesses of the first row 11 comprise a notch 15 that extends from the lateral recess to the central recess. The notch 15 has an edge that extends at least partially parallel to an edge of the central recess. The notch gradually widens as it approaches the central recess. The notch is free of a permanent magnet.

The notch 15 of the first row has an edge that forms an angle $\beta 1$ with an axis perpendicular to an axis of the pole. The edge in question is the edge of the notch located on the side of the lamination strip between the two rows of recesses. The edge is substantially rectilinear. The angle $\beta 1$ is for example 23.3° or 25°. The ratio $\beta 2 / \beta 1$ is for example 2.15 or 2.

The central recess of the first row is separated from each of the lateral recesses 10 by a material bridge 20. The first row thus comprises two material bridges 20 on either side of the central recess.

Each of the material bridges 20 extends along an axis of the material bridge that forms a non-zero angle γ with the axis of the pole P. The angle γ is for example of the order of 25°. Each material bridge 20 is defined by two edges parallel to one another.

The material bridges 20 come closer to the axis of the pole as they approach the air gap and move away from an axis of rotation of the rotor. The material bridges 20 move away from the axis of the pole as they approach an axis of rotation of the rotor.

The central recess comprises an edge 10a on the side of the axis of rotation of the rotor which is at least partially rectilinear, being perpendicular to the axis of the pole P.

The central recess is defined on the side opposite the axis of rotation by a concave edge 10b formed by two rectilinear portions forming an angle therebetween.

Furthermore, the two recesses of the second row 12 also comprise a notch 15 that extends from said recess to the other recess of the second row. The notch gradually widens as it approaches the other recess. The notch is free of a permanent magnet.

The notch 15 comprises an edge on the side opposite the axis of rotation which is rectilinear and which extends perpendicularly to the axis of the pole P. The two edges of the two notches of the second row are thus aligned.

The notch 15 has an edge that forms an angle α1 with an axis perpendicular to an axis of the pole P. The edge in question is the edge of the notch located on the side of the lamination strip between the two rows of recesses. The angle α1 is for example 20°. The ratio α2/α1 is for example 2.25.

The ratio β1/α1 is for example 1.165 or 1.25. Considering the difference between β1 and α1, the two recesses 11, 12 are separated by the lamination strip B having a width that increases as it approaches the axis of the pole.

The two recesses of the second row 12 provide a material bridge 24 therebetween, said material bridge 24 extending along an axis of the material bridge that extends along an axis of the pole. The material bridge 24 may be defined by two edges parallel to one another. In particular, these two parallel edges are edges of the notches 15 of the two recesses of the second row 12.

Furthermore, the width of the second row of recesses increases as it approaches the axis of the pole. A ratio h1/h2 may be defined between the width h1 of the second row 12 at the axis of the pole and the width h2 of the second row at the air gap, at the ends of the rows. The ratio h1/h2 is in particular greater than 1. For example, it is possible to have h1/h2=1.33.

The lateral recesses of the first row 11 as well as the recesses of the second row 12 comprise at least one stop 16 for holding the permanent magnet intended to be accommodated in the recess, this stop 16 being located toward the air gap.

Figure 4A:
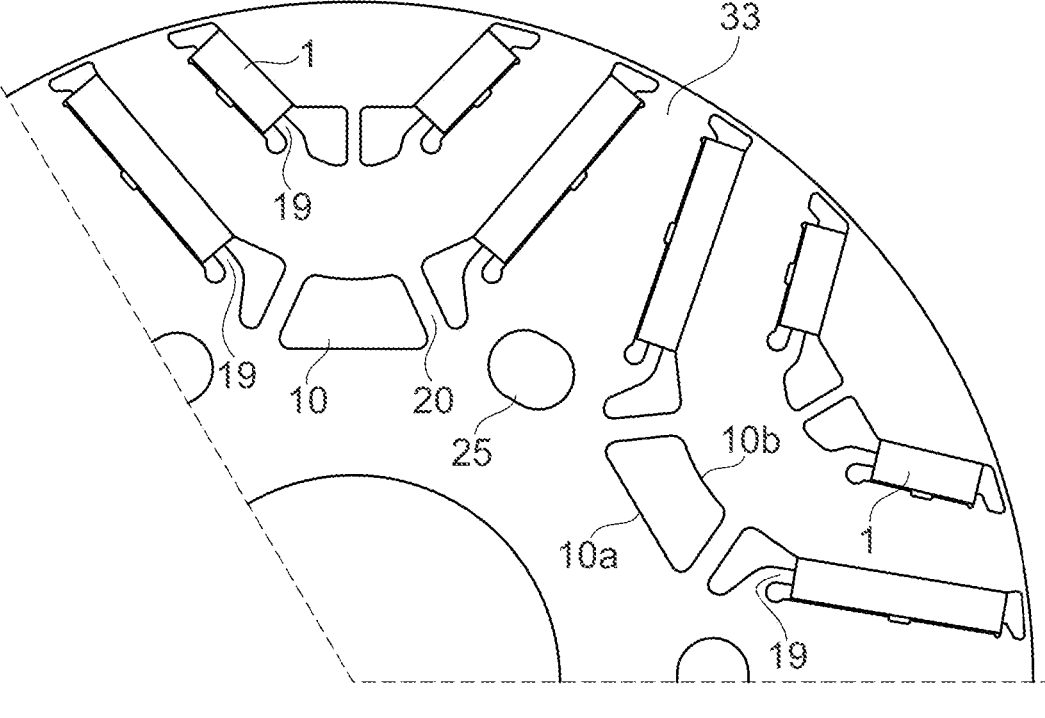
FIG. 4a is a view similar to FIG. 1 of an alternative embodiment.
Figure 4B:
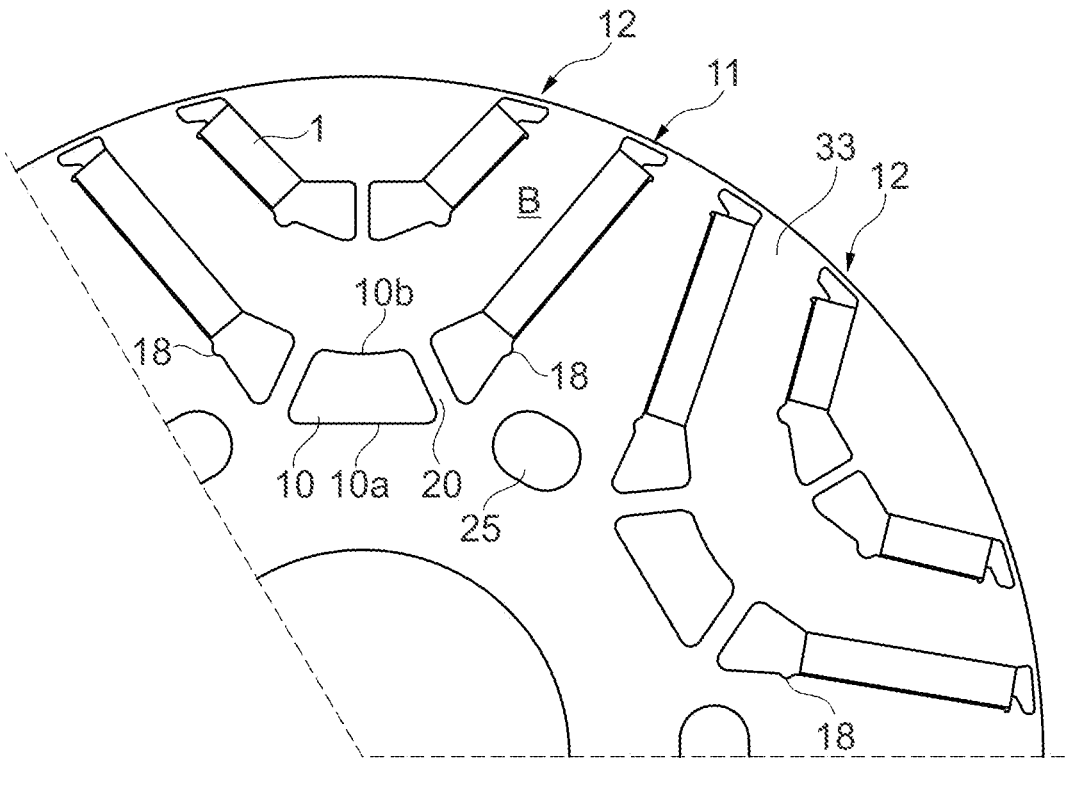

In the alternative embodiment shown in FIGS. 4a and 4b, certain laminations of the rotor comprise deformable tongues 19 which are each connected to a face of the corresponding recess, as shown in FIG. 4a, while other laminations of the stack do not comprise said tongues, as shown in FIG. 4b. In the example shown, only the lateral recesses of the first rows 11 and the recesses of the second rows 12 comprise such a deformable tongue 19.

The deformable tongues 19 each extend into the corresponding recess. Each deformable tongue 19 comprises a portion which is bent so as to press against a short side of the corresponding magnet. The bendable portion of the deformable tongue 19 is bent out of the plane of the laminations, along a bending axis of the deformable tongue 19 that extends in a plane parallel to the plane of the lamination.

In one embodiment, some laminations of the rotor may comprise, alternatively or additionally, tongues that come into contact with the permanent magnet on a long side thereof.

The alternative embodiment shown in FIGS. 4a and 4b also differs from the preceding embodiment by the fact that the central recess is defined on the side opposite the axis of rotation by a concave edge 10b that is rounded, extending along an arc of circle.

In one embodiment, the rotor may for example comprise eight stacks of laminations, each stack comprising 50 laminations, 3 of which with tongues and 47 without tongues. Each magnet is thus held by 3 tongues.

Furthermore, in this embodiment it can be seen that the recesses 10 comprise a cutout 18 provided in a face of the recess 10 on the side of the axis of rotation of the rotor, between the deformable tongue 19 and the magnet 1. Part of the magnet 1 extends into the space 43 formed in the recess 10 by the cutout 18. The magnet 1 thus at least partially covers the cutout 18. These cutouts make it possible to facilitate the folding of the tongues and facilitate the cutting of the laminations.

The laminations also comprise cavities 25 which can be used during manufacture as identification, and which may also optionally be useful for stiffening the rotor in order to pass tie rods.

Of course, the shapes of the recesses 10 and notches 15 might vary without departing from the scope.

In the example described, the rotor comprises 6 poles. Of course, it is not outside the scope if the number of poles is different, for example, 8.

The invention claimed is:

1. A rotor for a rotary electric machine, comprising a rotor body comprising laminations stacked one on top of the other, the rotor body comprising a plurality of recesses, at least some of the recesses accommodating one or more permanent magnets defining poles of the rotor, the recesses of a pole being arranged in at least a first row and a second row of recesses which are not parallel to one another, the first row of recesses comprising at least three recesses arranged in a U shape, with at least one central recess and two lateral recesses, the central recess of the first row being able to be free of a permanent magnet, the second row of recesses comprising recesses arranged in a V shape, the central recess of the first row being separated from each of the lateral recesses by a material bridge, each of the material bridges extending along an axis of the material bridge which forms a non-zero angle (y) with an axis of the pole (P), at least one of the lateral recesses of the first row comprising a notch that extends from the lateral recess to the central recess, the notch having an edge located on a side of a lamination strip between the two rows of recesses that forms an angle (β1) with an axis perpendicular to an axis of the pole, the edge being rectilinear or at least partially rectilinear.

2. The rotor according to claim 1, wherein the permanent magnets accommodated in the lateral recesses of the first row extend in cross section along a large axis forming an angle β2 with an axis perpendicular to an axis of the pole (P), and the permanent magnets accommodated in the recesses of the second row extend in cross section along a large axis forming an angle $\alpha2$ with an axis perpendicular to an axis of the pole (P), wherein $\beta2>\alpha2$.

3. The rotor according to claim 2, wherein the ratio $\beta2/\alpha2$ is between 1 and 1.25, excluding the value 1.

4. The rotor according to claim 1, wherein the two lateral recesses of the first row comprise a notch that extends from the lateral recess toward the central recess.

5. The rotor according to claim 4, wherein the notch has an edge that forms an angle (31) with an axis perpendicular to an axis of the pole.

6. The rotor according to claim 4, wherein the notch has an edge that extends at least partially parallel to an edge of the central recess.

7. The rotor according to claim 6, wherein the angle ($\gamma$) is between 10° and 40°.

8. The rotor according to claim 6, wherein the angle ($\gamma$) is between 20° and 30°.

9. The rotor according to claim 6, wherein the angle ($\gamma$) is 25°.

10. The rotor according to claim 1, wherein the material bridges come closer to the axis of the pole (P) as they approach the air gap and move away from an axis of rotation of the rotor.

11. The rotor according to claim 1, wherein the lateral recesses of the first row are provided with permanent magnets.

12. The rotor according to claim 1, wherein at least one of the recesses of the second row comprises a notch that extends from said recess toward the other recess of the second row.

13. The rotor according to claim 12, wherein the notch has an edge that forms an angle ($\alpha1$) with an axis perpendicular to an axis of the pole.

14. The rotor according to claim 12, wherein the two recesses of the second row each comprise a notch that extends from said recess toward the other recess of the second row.

15. The rotor according to claim 1, wherein the two recesses of the second row form therebetween a material bridge, said material bridge extending along an axis of the material bridge that extends along an axis of the pole.

16. The rotor according to claim 1 comprising 6 poles.

17. The rotor according to claim 1, wherein at least one recess comprises at least one stop for holding the permanent magnet intended to be accommodated in the recess.

18. A rotary electric machine, comprising a stator and a rotor as defined in claim 1.

19. The rotor according to claim 1, wherein all of the recesses accommodate one or more permanent magnets defining poles of the rotor.

20. The rotor according to claim 1, wherein the second row of recesses comprises two recesses arranged in a V shape.

21. A rotor for a rotary electric machine, comprising a rotor body comprising laminations stacked one on top of the other, the rotor body comprising a plurality of recesses, at least some of the recesses accommodating one or more permanent magnets defining poles of the rotor, the recesses of a pole (P) being arranged in at least a first row and a second row of recesses which are not parallel to one another, the first row of recesses comprising at least three recesses arranged in a U shape, with at least one central recess and two lateral recesses, the central recess of the first row being able to be free of a permanent magnet, the second row of recesses comprising recesses arranged in a V shape, the central recess of the first row being separated from each of the lateral recesses by a material bridge, each of the material bridges extending along an axis of the material bridge which forms a non-zero angle ($\gamma$) with an axis of the pole (P), at least one of the lateral recesses of the first row comprising a notch that extends from the lateral recess to the central recess, the notch having an edge that forms an angle ($\beta1$) with an axis perpendicular to an axis of the pole (P), the edge being rectilinear or at least partially rectilinear, wherein the permanent magnets accommodated in the lateral recesses of the first row extend in cross section along a large axis forming an angle $\beta2$ with an axis perpendicular to an axis of the pole (P), and the permanent magnets accommodated in the recesses of the second row extend in cross section along a large axis forming an angle $\alpha2$ with an axis perpendicular to an axis of the pole (P), wherein $\beta2>\alpha2$, wherein the ratio ($\beta2/\alpha2$ is between 1 and 1.25, excluding the value 1.

\* \* \* \* \*